(12) United States Patent
Hwang et al.

(10) Patent No.: US 10,334,304 B2
(45) Date of Patent: Jun. 25, 2019

(54) SET TOP BOX AUTOMATION (71) Applicant: Vivint, Inc., Provo, UT (US)

(72) Inventors: Jungtaik Hwang, Draper, UT (US);
Matthew J. Eyring, Provo, UT (US);
James E. Nye, Alpine, UT (US);
Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/858,126

(22) Filed: Dec. 29, 2017

(65) Prior Publication Data

US 2018/0124450 A1    May 3, 2018

Related U.S. Application Data

(63) Continuation of application No. 14/291,835, filed on May 30, 2014, now abandoned.

(60) Provisional application No. 61/834,409, filed on Jun. 12, 2013.

(51) Int. Cl.
| | |
|---|---|
| H04N 7/18 | (2006.01) |
| G08B 13/196 | (2006.01) |
| H04N 21/422 | (2011.01) |
| H04N 21/433 | (2011.01) |
| H04N 21/436 | (2011.01) |
| H04N 21/442 | (2011.01) |
| H04N 21/472 | (2011.01) |
| H04N 21/485 | (2011.01) |

(Continued)

(52) U.S. Cl.
CPC ... *H04N 21/42201* (2013.01); *H04N 21/4223* (2013.01); *H04N 21/42202* (2013.01); *H04N 21/42203* (2013.01); *H04N 21/4334* (2013.01); *H04N 21/43615* (2013.01); *H04N 21/442* (2013.01); *H04N 21/47214* (2013.01); *H04N 21/485* (2013.01); *H04N 21/4882* (2013.01); *G08B 13/19656* (2013.01); *G08B 13/19691* (2013.01); *H04N 7/18* (2013.01)

(58) Field of Classification Search
None
See application file for complete search history.

(56) References Cited

U.S. PATENT DOCUMENTS

| | | |
|---|---|---|
| 5,252,947 A | 10/1993 | Marciano |
| 5,289,362 A | 2/1994 | Liebl et al. |
| 5,398,057 A | 3/1995 | Tapp |

(Continued)

FOREIGN PATENT DOCUMENTS

| | | |
|---|---|---|
| KR | 1020040067511 A | 7/2004 |
| WO | 2010147688 A1 | 12/2010 |

OTHER PUBLICATIONS

Supplementary European Search Report for International Application No. EP 14811212, dated Oct. 27, 2016.

(Continued)

*Primary Examiner* — James R Marandi
(74) *Attorney, Agent, or Firm* — Holland & Hart, LLP (57) ABSTRACT

A computer-implemented method for integration of a set top box and an automation system is described. In one configuration, subscriber program content is provided. An aspect of a premises is monitored via one or more sensors. A monitor channel may be provided to display the monitored aspect of the premises. The monitor channel may be displayed in a channel guide among channels of the subscriber program content.

20 Claims, 7 Drawing Sheets

(51) Int. Cl.
*H04N 21/488* (2011.01)
*H04N 21/4223* (2011.01)

(56) References Cited

U.S. PATENT DOCUMENTS

| | | | |
|---|---|---|---|
| 5,572,438 A | 11/1996 | Ehlers et al. |
| 5,657,076 A | 8/1997 | Tapp |
| 5,815,219 A | 9/1998 | Okuizumi |
| 5,822,012 A | 10/1998 | Jeon et al. |
| 6,529,230 B1 | 3/2003 | Chong |
| 6,792,319 B1 | 9/2004 | Bilger |
| 6,868,292 B2 | 3/2005 | Ficco et al. |
| 6,868,293 B1 | 3/2005 | Schurr et al. |
| 6,874,691 B1 | 4/2005 | Hildebrand |
| 7,061,393 B2 | 6/2006 | Buckingham et al. |
| 7,119,675 B2 | 10/2006 | Khandelwal et al. |
| 7,124,397 B1 | 10/2006 | Mathur et al. |
| 7,129,833 B2 | 10/2006 | Albert |
| 7,181,293 B2 | 2/2007 | Rothman et al. |
| 7,260,610 B2 | 8/2007 | Grooters et al. |
| 7,298,871 B2 | 11/2007 | Lee et al. |
| 7,327,251 B2 | 2/2008 | Corbett, Jr. |
| 7,342,488 B2 | 3/2008 | Wolfe et al. |
| 7,403,598 B2 | 7/2008 | Tyroler et al. |
| 7,403,838 B2 | 7/2008 | Deen et al. |
| 7,425,977 B2 | 9/2008 | Sakai |
| 7,461,343 B2 | 12/2008 | Kates |
| 7,558,671 B2 | 7/2009 | Dossas et al. |
| 7,561,977 B2 | 7/2009 | Horst et al. |
| 7,565,227 B2 | 7/2009 | Richard et al. |
| 7,616,123 B2 | 11/2009 | Ridder et al. |
| 7,650,319 B2 | 1/2010 | Hoffberg et al. |
| 7,664,239 B2 | 2/2010 | Groff et al. |
| 7,719,440 B2 | 5/2010 | Delp et al. |
| 7,743,096 B2 | 6/2010 | Bouilloux-Lafont et al. |
| 7,746,223 B2 | 6/2010 | Howarter et al. |
| 7,786,891 B2 | 8/2010 | Owens et al. |
| 7,924,149 B2 | 4/2011 | Mendelson |
| 7,962,485 B1 | 6/2011 | Trandal et al. |
| 7,978,059 B2 | 7/2011 | Petite et al. |
| 7,990,985 B2 | 8/2011 | Chen |
| 8,006,268 B2 | 8/2011 | Sloo |
| 8,024,073 B2 | 9/2011 | Imes et al. |
| 8,042,048 B2 | 10/2011 | Wilson et al. |
| 8,049,613 B2 | 11/2011 | Poder |
| 8,091,794 B2 | 1/2012 | Siddaramanna et al. |
| 8,095,233 B1 | 1/2012 | Shankar et al. |
| 8,098,281 B1 | 1/2012 | Croak et al. |
| 8,099,195 B2 | 1/2012 | Imes et al. |
| 8,108,076 B2 | 1/2012 | Imes et al. |
| 8,159,334 B2 | 4/2012 | McClenny et al. |
| 8,166,498 B2 | 4/2012 | Walter |
| 8,181,199 B2 | 5/2012 | Jeong |
| 8,200,186 B2 | 6/2012 | Ashley, Jr. et al. |
| 8,234,676 B2 | 7/2012 | Klein et al. |
| 8,239,073 B2 | 8/2012 | Fausak et al. |
| 8,242,900 B2 | 8/2012 | Bennett, III et al. |
| 8,244,102 B2 | 8/2012 | Bhogal et al. |
| 8,289,182 B2 | 10/2012 | Vogel et al. |
| 8,295,990 B2 | 10/2012 | Venkatakrishnan et al. |
| 8,299,889 B2 | 10/2012 | Kumar et al. |
| 8,299,939 B2 | 10/2012 | Gudlavenkatasiva et al. |
| 8,301,270 B2 | 10/2012 | Quail |
| 8,316,413 B2 | 11/2012 | Crabtree |
| 8,321,885 B2 | 11/2012 | Pino, Jr. et al. |
| 8,332,055 B2 | 12/2012 | Veillette |
| 8,374,728 B2 | 2/2013 | Kim |
| 8,386,082 B2 | 2/2013 | Oswald |
| 8,390,462 B2 | 3/2013 | Belz et al. |
| 8,397,264 B2 | 3/2013 | Ansari et al. |
| 8,400,322 B2 | 3/2013 | Acedo et al. |
| 8,411,208 B2 | 4/2013 | McRae |
| 8,413,204 B2 | 4/2013 | White et al. |
| 8,423,000 B2 | 4/2013 | Dhuna |
| 8,429,707 B2 | 4/2013 | Patel et al. |
| 8,442,501 B1 | 5/2013 | Rao et al. |
| 8,447,289 B2 | 5/2013 | Rao et al. |
| 8,467,908 B2 | 6/2013 | Broniak et al. |
| 8,472,937 B1 | 6/2013 | Rao et al. |
| 8,473,111 B1 | 6/2013 | Shankar et al. |
| 8,489,242 B2 | 7/2013 | Valluri et al. |
| 8,498,749 B2 | 7/2013 | Imes et al. |
| 8,504,921 B2 | 8/2013 | Wilson et al. |
| 8,510,255 B2 | 8/2013 | Fadell et al. |
| 2002/0082748 A1 | 6/2002 | Enga et al. |
| 2002/0094111 A1 | 7/2002 | Puchek et al. |
| 2002/0097165 A1 | 7/2002 | Hulme et al. |
| 2003/0070182 A1 | 4/2003 | Mead |
| 2004/0010808 A1 | 1/2004 | deCarmo |
| 2004/0024717 A1 | 2/2004 | Sneeringer |
| 2004/0025179 A1 | 2/2004 | Russ et al. |
| 2004/0034873 A1 | 2/2004 | Zenoni |
| 2004/0049785 A1 | 3/2004 | Grzeczkowski et al. |
| 2004/0059815 A1 | 3/2004 | Buckingham et al. |
| 2004/0083128 A1 | 4/2004 | Buckingham et al. |
| 2004/0148632 A1 | 7/2004 | Park et al. |
| 2004/0212498 A1 | 10/2004 | Peterson et al. |
| 2004/0254683 A1 | 12/2004 | Kim |
| 2005/0086341 A1 | 4/2005 | Enga et al. |
| 2005/0108091 A1 | 5/2005 | Sotak et al. |
| 2005/0159863 A1 | 7/2005 | Howard et al. |
| 2005/0228883 A1* | 10/2005 | Brown ............. A61B 5/0002 709/224 |
| 2006/0022816 A1 | 2/2006 | Yukawa |
| 2006/0080408 A1 | 4/2006 | Istvan et al. |
| 2006/0168618 A1 | 7/2006 | Choi |
| 2006/0190974 A1 | 8/2006 | Lee |
| 2006/0202832 A1 | 9/2006 | Reznik et al. |
| 2006/0270421 A1 | 11/2006 | Phillips et al. |
| 2006/0277576 A1 | 12/2006 | Acharya et al. |
| 2006/0293100 A1 | 12/2006 | Walter |
| 2007/0103835 A1 | 5/2007 | Sorenson |
| 2007/0112939 A1 | 5/2007 | Wilson et al. |
| 2007/0126873 A1 | 6/2007 | Xu et al. |
| 2007/0130593 A1 | 6/2007 | Choi et al. |
| 2007/0192486 A1 | 8/2007 | Wilson |
| 2007/0239317 A1 | 10/2007 | Bogolea et al. |
| 2007/0256105 A1 | 11/2007 | Tabe |
| 2008/0001773 A1 | 1/2008 | Rye et al. |
| 2008/0007621 A1 | 1/2008 | Ying et al. |
| 2008/0011864 A1 | 1/2008 | Tessier et al. |
| 2008/0055423 A1 | 3/2008 | Ying et al. |
| 2008/0088438 A1 | 4/2008 | Aninye et al. |
| 2008/0092199 A1 | 4/2008 | McCarthy et al. |
| 2008/0129821 A1 | 6/2008 | Howarter et al. |
| 2008/0168503 A1 | 7/2008 | Sparrell |
| 2008/0195254 A1 | 8/2008 | Jung et al. |
| 2008/0242319 A1 | 10/2008 | Paschetto et al. |
| 2008/0309759 A1 | 12/2008 | Wilson et al. |
| 2009/0007170 A1 | 1/2009 | Everitt et al. |
| 2009/0138805 A1 | 5/2009 | Hildreth |
| 2009/0150925 A1 | 6/2009 | Henderson |
| 2010/0050215 A1 | 2/2010 | Wester |
| 2010/0070101 A1 | 3/2010 | Benes et al. |
| 2010/0076615 A1 | 3/2010 | Daniel et al. |
| 2010/0121968 A1 | 5/2010 | Clark |
| 2010/0138007 A1 | 6/2010 | Clark et al. |
| 2010/0168924 A1 | 7/2010 | Tessier et al. |
| 2010/0173677 A1 | 7/2010 | Fu |
| 2010/0192171 A1 | 7/2010 | Dozoretz et al. |
| 2010/0211972 A1 | 8/2010 | Howarter et al. |
| 2010/0241284 A1 | 9/2010 | Maeda et al. |
| 2010/0250015 A1 | 9/2010 | Flikkema |
| 2010/0262313 A1 | 10/2010 | Chambers et al. |
| 2010/0289644 A1 | 11/2010 | Slavin et al. |
| 2010/0319034 A1 | 12/2010 | Mountain |
| 2010/0332235 A1 | 12/2010 | David |
| 2011/0015797 A1 | 1/2011 | Gilstrap |
| 2011/0022242 A1 | 1/2011 | Bukhin |
| 2011/0030021 A1 | 2/2011 | Campagna et al. |
| 2011/0032423 A1 | 2/2011 | Jing et al. |
| 2011/0046798 A1 | 2/2011 | Imes et al. |
| 2011/0046799 A1 | 2/2011 | Imes et al. |
| 2011/0046805 A1 | 2/2011 | Bedros et al. |

(56) References Cited

U.S. PATENT DOCUMENTS

| | | |
|---|---|---|
| 2011/0061080 A1 | 3/2011 | Hill et al. |
| 2011/0088003 A1 | 4/2011 | Swink et al. |
| 2011/0093876 A1 | 4/2011 | Belz et al. |
| 2011/0153101 A1 | 6/2011 | Thomas et al. |
| 2011/0173668 A1 | 7/2011 | Rooks et al. |
| 2011/0181412 A1 | 7/2011 | Alexander et al. |
| 2011/0187930 A1 | 8/2011 | Crabtree |
| 2011/0190952 A1 | 8/2011 | Goldstein |
| 2011/0202189 A1 | 8/2011 | Venkatakrishnan et al. |
| 2011/0202195 A1 | 8/2011 | Finch et al. |
| 2011/0211584 A1 | 9/2011 | Mahmoud |
| 2011/0264276 A1 | 10/2011 | Kressner et al. |
| 2011/0264294 A1 | 10/2011 | Chen |
| 2011/0296459 A1 | 12/2011 | Medina et al. |
| 2011/0299412 A1 | 12/2011 | Diab et al. |
| 2011/0307101 A1 | 12/2011 | Imes et al. |
| 2011/0317622 A1 | 12/2011 | Arsenault |
| 2011/0321073 A1 | 12/2011 | Yarvis et al. |
| 2012/0017012 A1 | 1/2012 | Bartholomay et al. |
| 2012/0020518 A1 | 1/2012 | Taguchi |
| 2012/0053739 A1 | 3/2012 | Brian et al. |
| 2012/0053740 A1 | 3/2012 | Venkatakrishnan et al. |
| 2012/0053741 A1 | 3/2012 | Beyerle et al. |
| 2012/0059932 A1 | 3/2012 | Messer et al. |
| 2012/0065787 A1 | 3/2012 | Broniak et al. |
| 2012/0065791 A1 | 3/2012 | Besore et al. |
| 2012/0083937 A1 | 4/2012 | Kong et al. |
| 2012/0084808 A1 | 4/2012 | Howarter et al. |
| 2012/0092163 A1 | 4/2012 | Hart |
| 2012/0101637 A1 | 4/2012 | Imes et al. |
| 2012/0109395 A1 | 5/2012 | Finch et al. |
| 2012/0117503 A1 | 5/2012 | Hofrichter et al. |
| 2012/0131672 A1 | 5/2012 | O'Reirdan et al. |
| 2012/0166004 A1 | 6/2012 | Park et al. |
| 2012/0166007 A1 | 6/2012 | Jeong et al. |
| 2012/0185801 A1 | 7/2012 | Madonna et al. |
| 2012/0215725 A1 | 8/2012 | Imes et al. |
| 2012/0221718 A1 | 8/2012 | Imes et al. |
| 2012/0232701 A1 | 9/2012 | Carty et al. |
| 2012/0239202 A1 | 9/2012 | Voysey |
| 2012/0265586 A1 | 10/2012 | Mammone |
| 2012/0271475 A1 | 10/2012 | Wang et al. |
| 2012/0272261 A1 | 10/2012 | Reynolds et al. |
| 2012/0272267 A1 | 10/2012 | Klein et al. |
| 2012/0273581 A1 | 11/2012 | Kolk et al. |
| 2012/0291068 A1 | 11/2012 | Khushoo et al. |
| 2012/0323368 A1 | 12/2012 | White, III et al. |
| 2012/0323382 A1 | 12/2012 | Kamel et al. |
| 2013/0006425 A1 | 1/2013 | Bell et al. |
| 2013/0006437 A1 | 1/2013 | Verfuerth et al. |
| 2013/0010120 A1 | 1/2013 | Nnoruka |
| 2013/0013123 A1 | 1/2013 | Ozaki |
| 2013/0033561 A1 | 2/2013 | Kwon et al. |
| 2013/0036440 A1 | 2/2013 | Eyer |
| 2013/0060393 A1 | 3/2013 | Somasundaram et al. |
| 2013/0090746 A1 | 4/2013 | Quail |
| 2013/0110295 A1 | 5/2013 | Zheng et al. |
| 2013/0113822 A1 | 5/2013 | Putrevu et al. |
| 2013/0117442 A1 | 5/2013 | Mountain |
| 2013/0125177 A1 | 5/2013 | Pino et al. |
| 2013/0145386 A1 | 6/2013 | Belz et al. |
| 2013/0147623 A1 | 6/2013 | Somasundaram et al. |
| 2013/0158728 A1 | 6/2013 | Lee et al. |
| 2013/0165152 A1 | 6/2013 | Nichols |
| 2013/0167035 A1 | 6/2013 | Imes et al. |
| 2013/0173071 A1 | 7/2013 | Lee et al. |
| 2013/0182905 A1 | 7/2013 | Myers et al. |
| 2013/0184880 A1 | 7/2013 | McMahon |
| 2013/0195285 A1 | 8/2013 | De la Fuente et al. |
| 2013/0204454 A1 | 8/2013 | Choi et al. |
| 2013/0330059 A1* | 12/2013 | Matsumoto ........ H04N 21/4722 386/241 |
| 2014/0123208 A1 | 5/2014 | Plagemann et al. |

OTHER PUBLICATIONS

International Search Report and Written Opinion of the International Searching Authority for PCT/US2014/041352, dated Oct. 22, 2014.

Nguyen, V., "Samsung Smart TV Voice, Gesture and Face Recognition Hands-On", retrieved from the internet: URL:http://www.slashgear.com/samsung-smart-tv-voice-gesture-and-face-recognition-hands-on-24229664/ [retrieved on Oct. 17, 2016], May 24, 2012.

* cited by examiner

SET TOP BOX AUTOMATION

CROSS-REFERENCE TO RELATED APPLICATIONS

The present Application is a continuation of U.S. patent application Ser. No. 14/291,835, filed May 30, 2014, titled "SET TOP BOX AUTOMATION," which claims the benefit of U.S. Provisional Patent Application No. 61/834,409, titled "SYSTEMS AND METHODS FOR SET TOP BOX HOME AUTOMATION," filed on Jun. 12, 2013, which is assigned to the assignee hereof, the disclosures of which are expressly incorporated herein in their entireties by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The widespread access to media has been accelerated by the increased use of computer networks, including the Internet and cloud networking.

Many businesses use one or more computer networks to deliver media between the various computers connected to the networks. Users of computer technologies continue to demand increased access to media and an increase in the efficiency of these technologies. Improving the efficiency of computer technologies is always desirable to anyone who uses and relies on computers.

With the wide-spread use of computers and mobile devices has come an increased presence of automation and home security products. Advancements in automation allow users to control aspects of their home using mobile computing devices. However, current implementations of automation may involve multiple devices in a piecemeal fashion.

SUMMARY

According to at least one embodiment, a computer-implemented method for integration of a set top box and an automation system is described. In one configuration, subscriber program content may be provided. An aspect of the premises may be monitored via one or more sensors. A monitor channel may be provided to display the monitored aspect of the premises. The monitor channel may be displayed in a channel guide among channels of the subscriber program content.

In some embodiments, the method may include tracking a plurality of entities associated with the premises and providing a tracking channel among channels of the subscriber program content. The tracking channel may display a map of the tracked plurality of entities. In some cases, the method may include modifying a native application programming interface (API) of the set top box in order to provide the monitor channel in the channel guide among the channels of the subscriber program content. Upon receiving a user command, the set top box may be configured to record the monitor channel for a specified duration on a specified date.

In one embodiment, a predetermined change related to the one or more sensors may be detected. A notification may be displayed on a display connected to the set top box. A user input may be received in reply to the displaying of the notification. The notification may be displayed in relation to a presently viewed channel of the subscriber program content. In some embodiments, the method includes pausing a channel from the subscriber program content and displaying the notification on at least a portion of the paused channel.

In one embodiment, upon detecting a first user input, an automation user interface may be displayed. The automation user interface may include information regarding the one or more sensors. Upon detecting a second user input in relation to the automation user interface, an aspect of at least one of the one or more sensors may be adjusted. In some embodiments, the first and second user inputs may include a voice command input, a video gesture input (e.g., a predetermined pattern of movement made by the user and detected by a camera), tactile gesture input (e.g., a predetermined pattern of movement made by the user on a touch pad), a mobile computing device input, a remote control device input, and the like.

In one example, subscriber program content may be provided. An action of a user may be monitored. Upon determining the monitored action of the user matches a predetermined user action, an aspect of at least one of the one or more sensors may be adjusted based on a current state of the one or more sensors. In one embodiment, the method includes detecting the action of the user via a camera connected to the set top box. In some cases the method includes identifying a pattern associated with the monitored action of the user, detecting an initiation of the identified pattern associated with the monitored action of the user, and/or upon detecting the initiation of the identified pattern, adjusting an aspect of the one or more sensors.

A computing device configured to integrate a set top box and an automation system is also described. The device may include a processor and memory in electronic communication with the processor. The memory may store instructions that may be executable by the processor to provide subscriber program content, monitor an aspect of a premises using one or more sensors, and provide a monitor channel to display the monitored aspect of the premises, the monitor channel being displayed in a channel guide among channels of the subscriber program content.

A computer-program product to integrate a set top box and an automation system is also described. The computer-program product may include a non-transitory computer-readable medium that stores instructions. The instructions may be executable by the processor to provide subscriber program content, monitor an aspect of a premises using one or more sensors, and provide a monitor channel to display the monitored aspect of the premises, the monitor channel being displayed in a channel guide among channels of the subscriber program content.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to automation. More specifically, the systems and methods described herein relate to integrating automation in a subscriber-based media content set top box, such as a satellite and/or cable digital video recorder (DVR). Currently, when a user is viewing programming delivered from a subscription content provider and wants to check a video camera feed or another automation input, the user typically exits the set top box and switches to a separate video input to view the automation input. The systems and methods described herein, however, allow a user to view a video camera feed from the subscriber-based media content set top box.

Figure 1:
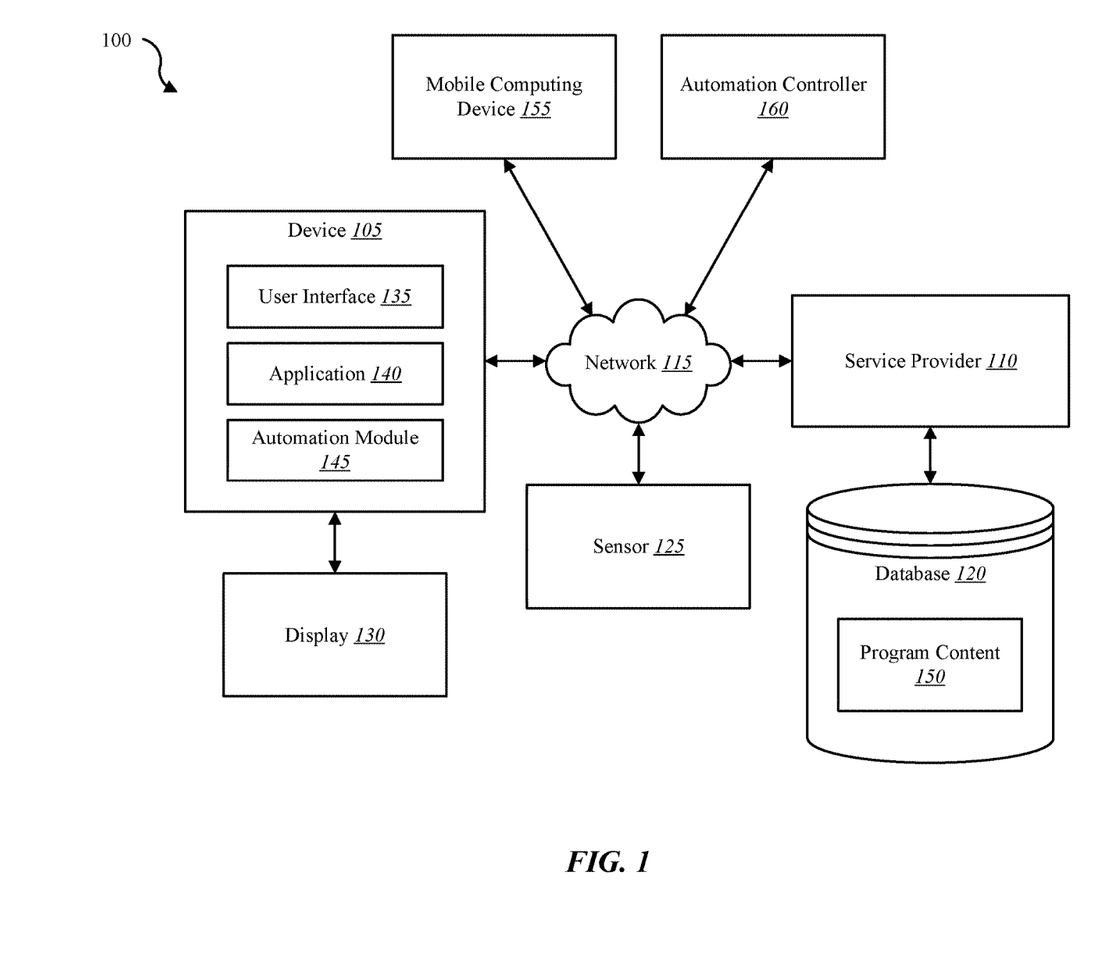
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, service provider 110, a sensor 125, a display 130, a mobile computing device 155, a automation controller 160, and a network 115 that allows the device 105, the service provider 110, the mobile computing device 155, automation controller 160, and sensor 125 to communicate. Examples of the device 105 include media content set top box, satellite set top box, cable set top box, DVRs, personal video recorders (PVRs), mobile devices, smart phones, personal computing devices, computers, servers, etc. Examples of the automation controller 160 include a dedicated automation computing device (e.g., wall-mounted controller), a personal computing device (e.g., laptop, desktop, etc.), a mobile computing device (e.g., tablet computing device, smartphone, etc.), and the like. Examples of the sensor 125 include a camera, three-dimensional (3-D) sensor, motion sensor, smoke sensor, glass break sensor, door sensor, window sensor, carbon monoxide sensor, and the like. Sensor 125 may also be integrated with a facial recognition system. Although sensor 125 is depicted as connecting to device 105 over network 115, in some embodiments, sensor 125 may connect directly to device 105.

In some configurations, the device 105 may include a user interface 135, application 140, and automation module 145. Although the components of the device 105 are depicted as being internal to the device 105 it is understood that one or more of the components may be external to the device 105 and connect to device 105 through wired and/or wireless connections. In some embodiments, application 140 may be located on mobile computing device 155 in order to allow a user to interface with a function of device 105 and/or automation module 145.

In some embodiments, device 105 may communicate with service provider 110 via network 115. Example of networks 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include an automation module 145. For example, the device 105 may include the application 140 that allows the device 105 to interface with the automation controller 160 via the automation module 145 located on service provider 110. In some embodiments, the device 105, the automation controller 160, and the service provider 110 may include an automation module 145 where at least a portion of the functions of the automation module 145 are performed separately and/or concurrently on the device 105, automation controller 160, and/or the service provider 110. Likewise, in some embodiments, a user may access the functions of device 105 and/or automation controller 160 (directly or through device 105 via automation module 145) from mobile computing device 155. For example, in some embodiments, mobile computing device 155 includes a mobile application that interfaces with one or more functions of device 105, automation controller 160, automation module 145, and/or service provider 110.

In some embodiments, the service provider 110 may be coupled to database 120. For example, device 105 may access program content 150 in database 120 over the network 115 via service provider 110. Database 120 may be internal or external to the service provider 110. In one example, the device 105 may be coupled to database 120 via network 115.

Automation module 145 may allow a user to control (either directly or via automation controller 160), from a subscription-content media set top box, an aspect of the premises, including security, locking or unlocking a door, checking the status of a door, locating a person or item, controlling lighting, thermostat, cameras, and the like. In some configurations, application 140 may enable device 105 to interface with automation controller 160 via automation module 145 to provide automation content to device 105 and/or mobile computing device 155. Thus, application 140, via the automation module 145, may allow users to control aspects of their home. Further details regarding the automation module 145 are discussed below.

Figure 2:
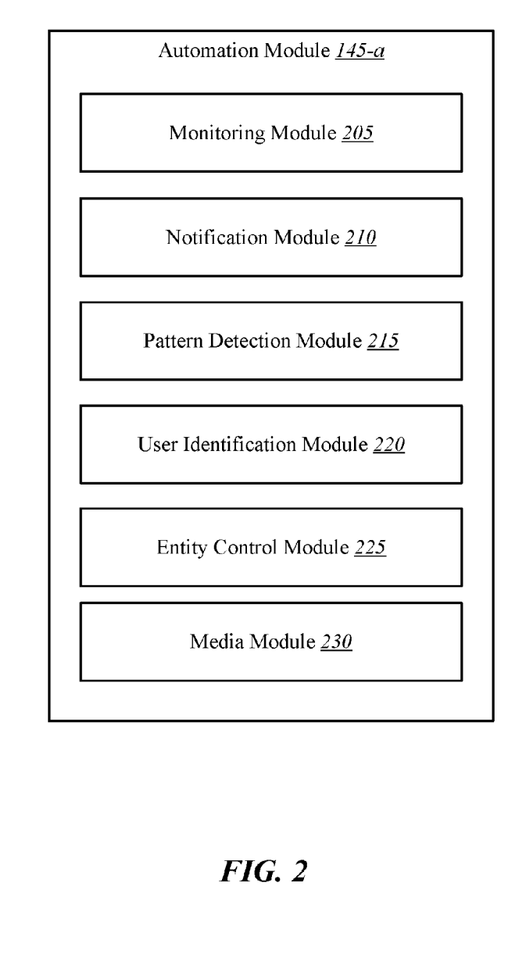
FIG. 2 is a block diagram illustrating one example of an automation module.

FIG. 2 is a block diagram illustrating one example of an automation module 145-*a*. The automation module 145-*a* may be one example of the automation module 145 depicted in FIG. 1. As depicted, the automation module 145-*a* may include a monitoring module 205, a notification module 210, a pattern detection module 215, a user identification module 220, an entity control module 225, and a media module 230.

In some embodiments, service provider 110 may provide subscriber program content (cable/satellite television programming, for example) to a user via a set top box located in a home, office, etc. of the user. Examples of set top boxes include cable set top boxes, satellite set top boxes, DVRs, personal video recorders (PVRs), and the like. Monitoring module 205 may be configured to monitor an entity, such as a security camera, a door lock, a door status, a smoke alarm (or other type of sensor), a home appliance, utility equipment, energy/utility usage, and the like. Home appliances may include a refrigerator, oven, microwave oven, stove, dishwasher, washer, dryer, and the like. Utility equipment may include a garage door opening system, heating ventilation air conditioning (HVAC) equipment, culinary water equipment (water heater, water softener, water meter, fire alarm, in-home sprinkler system, etc.), telephony equipment, irrigation water equipment (lawn sprinkler system, etc.), natural gas system (carbon monoxide sensor, gas meter, gas detection system, etc.), and the like. Monitoring module 205 may be configured to detect a predetermined change related to the entity or the triggering of a predetermined threshold related to the entity (carbon monoxide levels exceed a certain level, for example).

In one embodiment, notification module 210, in conjunction with the user interface 135, may display a notification on a display connected to the set top box. Notification module 210 may display the notification in relation to a presently viewed channel of the subscriber program content. In some cases, notification module 210 may display the notification in at least a portion of a viewing area of the channel. For example, a user watching content from a satellite DVR on a television may receive a notification displayed on at least a portion of the screen of the television. In some embodiments, entity control module 225, in conjunction with user interface 135, may receive a user input in response to the notification. For example, a notification relating to an oven (e.g., an oven timer), a washer/dryer cycle, a dishwasher wash cycle, water softener operation (e.g., time for a refill of the water softener), furnace operation (e.g., time to replace a furnace air filter), water heater, air conditioner, refrigerator, microwave oven, current energy use, energy use patterns, water use, and the like, may be displayed in conjunction with the content provided by a subscriber set top box. In one example, a user may set a timer for a meal cooking in an oven. With one minute left on the timer, the notification module 210 may display a notification on a channel presently being viewed by the user. When the notification is displayed, the content currently being viewed by the user on the channel may be paused. When a response to the notification is received or after a predetermined amount of time has lapsed, the content may resume.

In some embodiments, notification 210 may adapt a notification based on certain conditions. Notification module 210 may determine whether to display a notification on a display based on notification rules associated with a current state of device 105. For example, notification 210 may determine whether to display the notification based on the content provided by a set top box that a user is currently viewing. For instance, if a user is watching a particular sports event (e.g., WORLD SERIES®, SUPERBOWL®, etc.) notification 210 may block the notification from being displayed. In some cases, notification module 210 may alter the notification based on the current state of the device 105. For one type of programming and set top box content, notification module 210 may show scrolling text across an edge of the television screen. For another type of programming, notification module 210 may play a sound (e.g., a tone, a combination of tones, a recorded voice notification, a text to speech notification, and the like) based on the type of notification. In some embodiments, notification module 210 may alter the destination of the notification based on the type of notification and/or the type of programming currently being viewed by the user. For example, if the notification rules require minimum notification for a certain type of programming, the notification module 210 may display in alternative modes of communication. For instance, notification module 210 may email or text message a notification to a user based on the type of notification, the type of programming the user is currently watching, whether programming is currently being watched, and/or the current location of the user, etc.

In some cases, notification 210 may determine whether to display a notification in relation to programming currently being watched by the user and how to handle the programming based on the type of notification and/or the type of programming. For example, automation module 145-a may pause the programming for one type of notification, show a pop up message for another type of notification without pausing the programming, split the screen between a window for a security camera view and a window for the programming for another type of notification, and so forth. Additionally, or alternatively, notification module 210 may pause the programming for one type of notification based on one type of programming, block the notification for the same type of notification based on another type of programming, and continue showing the programming for the same type of notification based on a third type of programming.

The user may reply to the timer notification by dismissing the notification. Additionally, or alternatively, the user may respond by changing the time left on the timer. For example, the user may add additional time (e.g., 30 seconds) when the timer expires. In some embodiments, the notification module 210 may provide two or more options for the user to select (e.g., dismiss the notification, add 30 seconds to the timer, add 60 seconds to the timer, and the like), receive a selection from the user, and update the timer accordingly. In some embodiments, the automation module 145 may interact with one or more sensors associated with the oven, such as an oven camera, an oven temperature probe, etc. The notification module 210, may include the current state of the one or more sensors associated with the oven in the timer notification. Upon receiving a notification that the remaining time on the timer has expired, in some embodiments, the notification module 210 may notify the user that the timer has expired.

In some embodiments, as mentioned above, upon detecting a predetermined change related to the entity, media module 230 may pause subscriber program content currently provided on a channel. For example, the automation module 145-a may pause and/or record a portion of the content the user was viewing when the notification is displayed. In some cases, the notification may include a picture in picture notification, a text bar, scrolling text, a pop up, or drop down notification message. In some cases, the presently viewed channel may be paused upon the notification module 210 displaying the notification.

In one embodiment, the monitoring module 205 may monitor an entity associated with a home of a user in relation to content provided by a subscriber set top box. In one example, upon detecting a first user input, automation module 145-a, in conjunction with the execution of application 140, may be configured to display an automation user interface (e.g., user interface 135). The automation user interface may include access to information regarding the one or more sensors. Upon detecting a second user input in relation to the automation user interface, entity control module 225 may adjust an aspect of at least one of the one or more sensors.

User inputs comprise at least one of a voice command input, a video gesture input, tactile gesture input, a mobile computing device input, and a remote control device input. In some embodiments, automation module 145-a, in conjunction with the application 140 and user interface 135, may remotely interface with the automation user interface via a mobile application executing on a mobile computing device. For example, a user may press a menu button on a remote control configured to control a satellite DVR. A menu may appear that include access to automation functions, which may be provided as an automation application (e.g., application 140) executable from and within the satellite DVR. Upon selecting the automation function, the user may view, modify, or set a function related to automation.

In one embodiment, media module 230 may provide subscriber program content via a set top box. Monitoring module 205 may monitor both an entity associated with the premises and an action of the user. Thus, automation module 145-a may be configured to correlate a current state of an entity with a detected action of the user. Upon detecting that the monitored action of the user matches a predetermined user action, entity control module 225 may be configured to adjust an aspect of at least one of the one or more sensors based on the current state of the one or more sensors. In some embodiments, monitoring module 205, in conjunction with camera 125, may detect the action of the user via a camera connected to the set top box (e.g., camera 125). For example, monitoring module 205 may perform facial recognition and other recognition algorithms to detect and recognize an identity of a user. In some embodiments, a satellite DVR may filter available content based on user recognition. For example, a user may allow a child of a certain age to watch only certain programming appropriate to the child's age. Upon recognizing that the child is operating the satellite DVR, the automation module 145 may limit the content provided by the satellite DVR to the child to only age-appropriate content. In some embodiments, automation controller 160 may monitor a current state of device 105 (e.g., a satellite DVR is on, off, presently switched off, the time at which it is turned on or off, program is currently being watched, etc.). Based on the present state of the satellite DVR, automation controller 160 may execute one or more automation commands automatically. For example, automation controller 160 may detect that a user switches off the satellite DVR at or after a certain time (e.g., at or after 11:00 P.M.). In response, automation controller 160 may lock a door or window that it detects is currently unlocked, warn the user of a door or window currently open, turn on or off one or more certain lights in or outside the home, adjust a temperature on a thermostat, and the like.

In some embodiments, pattern detection module 215 may be configured to identify a pattern associated with the monitored action of the user. In some embodiments, pattern detection module 215 may detect an initiation of the identified pattern associated with the monitored action of the user. Upon detecting the initiation of the identified pattern, entity control module 225 may adjust an aspect of at least one of the one or more sensors. For example, pattern detection module 215 may detect that a certain user dims the lights to a certain level, watches a certain program at certain times each week, and routinely turns off the dishwasher when it is running during the certain times. Upon recognizing the pattern, automation module 145 may automatically turn on the television, tune a satellite and/or cable set top box to a particular channel, dim the lights to a predetermined level, and pause the dishwasher cycle, if it is currently running. Upon detecting the end period of the satellite content, automation module 145-a may resume the dishwasher cycle.

In one embodiment, media module 230 may provide subscriber program content via a set top box located in a premises. Monitoring module 205 may monitor an aspect of the premises. Media module 230, in conjunction with the user interface 135, may provide a monitor channel to display the monitored aspect of the home to the user. The monitor channel may be displayed in a channel guide among channels of the subscriber program content. For example, a subscription to cable or satellite media content may include a channel guide that includes a list of selectable channels and their respective content. Among the list of channels provided by subscription, automation module 145-a may append one or more automation channels that are selectable and interact with user commands in a similar manner as the subscription channels in the channel guide.

In one embodiment, entity control module 225 may track a plurality of entities associated with a premises. Tracked entities may include persons, pets, objects, etc., allowing the media set top box to track a person, a pet, and/or an item (e.g., set of keys, a mobile computing device, a remote control, and the like) using one or more technologies related to global positioning satellite (GPS) system, radio frequency identification (RFID), wireless (e.g., 802.11, etc.), near-field communications (NFC), and the like. Media module 230 may provide a tracking channel, similar to the monitor channel described above, to display a map of the tracked plurality of entities among channels of the subscriber program content. In some embodiments, automation module 145-a may provide an automation preview channel. The automation preview channel may provide a real-time preview of two or more automation channels. Media module 230 may access a native application programming interface (API) of the set top box in order to provide the monitoring, tracking, and other automation channels in the channel guide among the channels of the subscriber program content. In some embodiments, media module 230 may modify an aspect of the set top box API in order to provide the automation channels in the channel guide among the subscription channels. Upon receiving a user command, media module 230, in conjunction with the user interface 135, may schedule the set top box to record the monitor channel, tracking channel, or other automation channels for a specified duration on a specified date. In some embodiments, a recording of an automation channel may be event-driven, such as recording an automation channel upon detecting motion at a security camera communicatively connected to the set top box. In some embodiments, upon detecting motion at a front door camera, automation module 145-a may pause the content a user is currently viewing from the media set top box and switch to a channel on the set top box dedicated to displaying the content of the front door camera. In some embodiments, automation module 145-a may split the screen to show the current content provided by a media provider and the front door camera channel. Alternatively, automation module 145-a may display the front door camera in a picture in picture element over the current channel.

Figure 3:
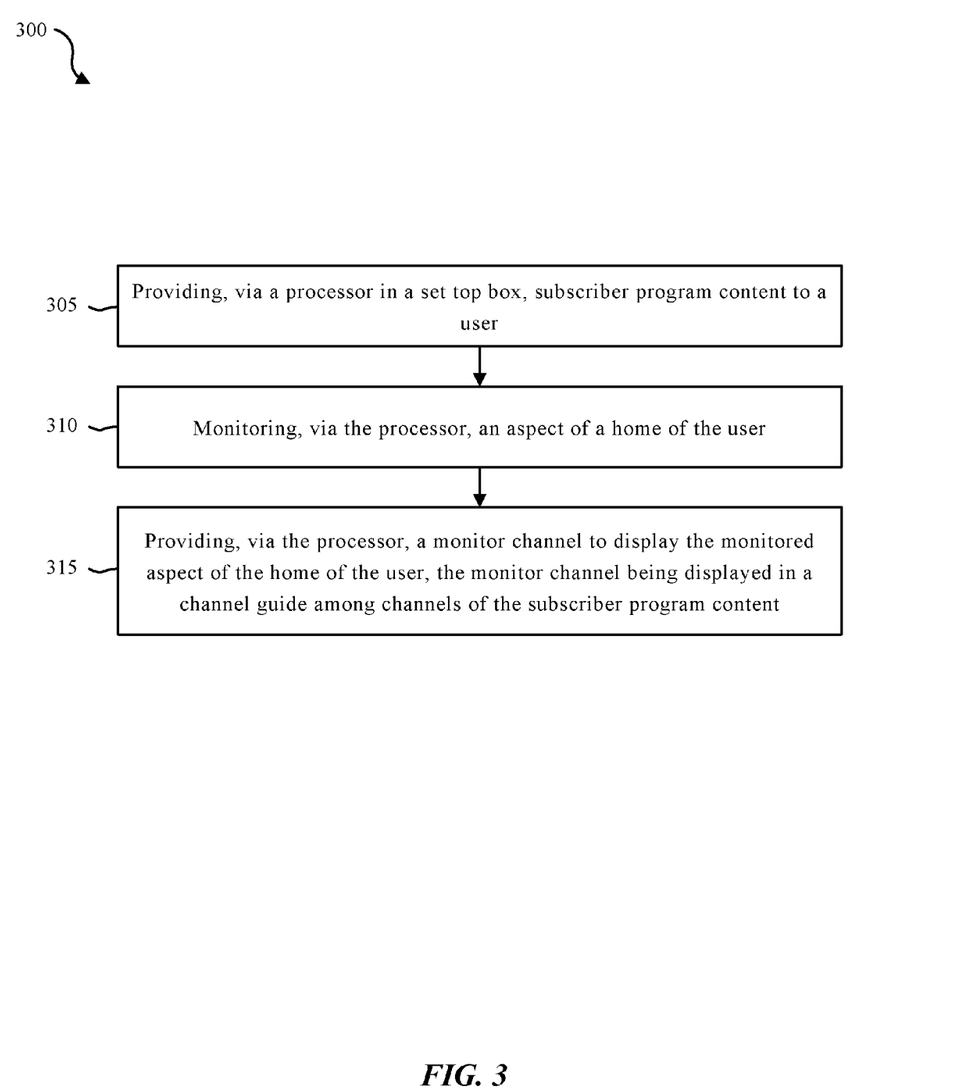
FIG. 3 is a flow diagram illustrating one embodiment of a method for providing a bidirectional notification via a media set top box.

FIG. 3 is a flow diagram illustrating one embodiment of a method 300 for providing an automation channel in a channel guide of a media set top box. In some configurations, the method 300 may be implemented by the automation module 145 illustrated in FIG. 1 or 2. In some configurations, the method 300 may be implemented in conjunction with the application 140 and/or the user interface 135 illustrated in FIG. 1.

At box 305, subscriber program content may be provided to a user. At box 310, an aspect of a premises may be monitored via one or more sensors (e.g., automation and/or security sensors). At block 315, a monitor channel may be provided to display the monitored aspect of the premises. The monitor channel may be displayed in a channel guide among channels of the subscriber program content.

Figure 4:
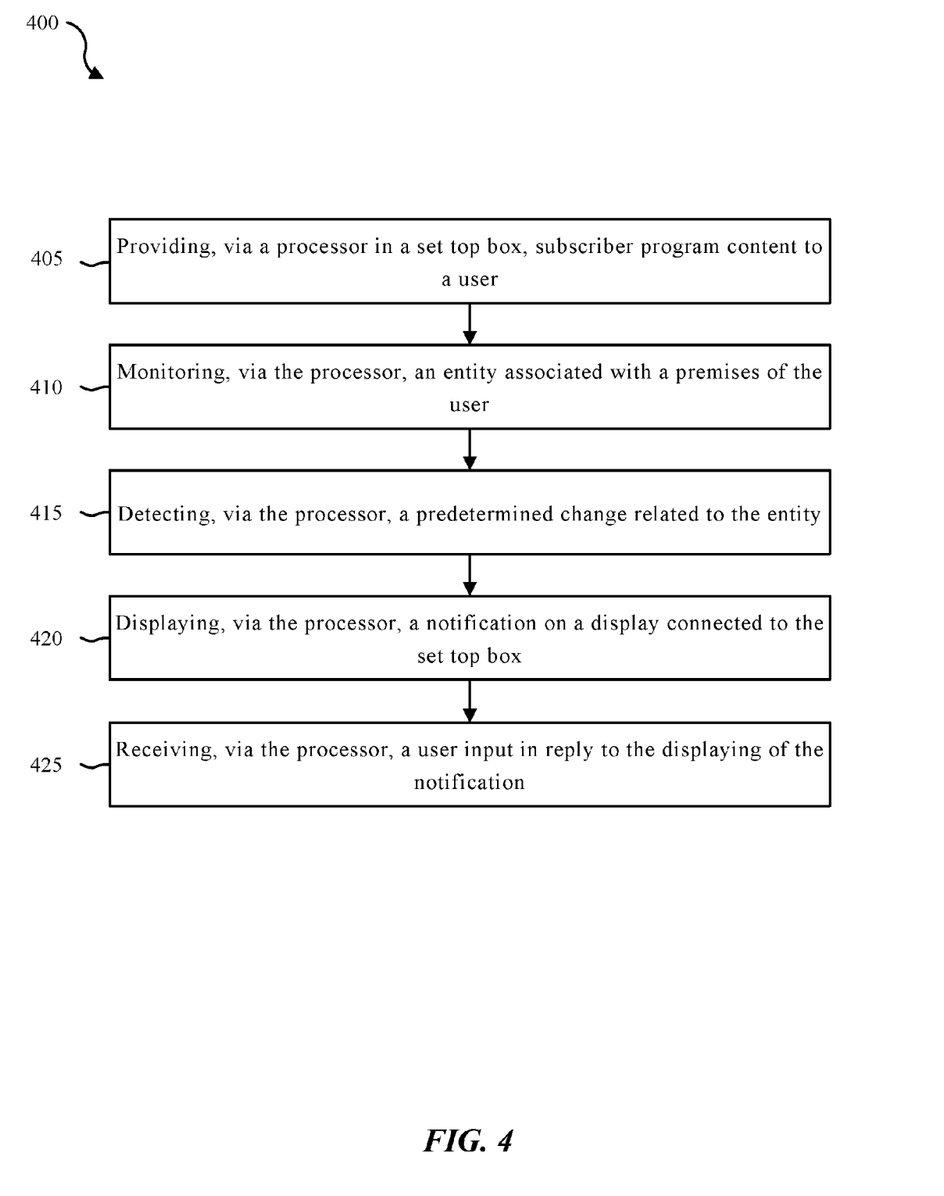
FIG. 4 is a flow diagram illustrating one embodiment of a method for receiving a user input to control automation via a media set top box.

FIG. 4 is a flow diagram illustrating one embodiment of a method 400 for providing a bi-directional notification via a media set top box. In some configurations, the method 400 may be implemented by the automation module 145 illustrated in FIG. 1 or 2. In some configurations, the method 400 may be implemented in conjunction with the application 140 and/or the user interface 135 illustrated in FIG. 1.

At step 405, subscriber program content may be provided to a user via a processor in a set top box. At step 410, an entity associated with a premises may be monitored by the set top box. At step 415, a predetermined change related to the entity may be detected. At step 420, a notification may be displayed on a display connected to the set top box. At step 425, a user input may be received in response to the displayed notification.

Figure 5:
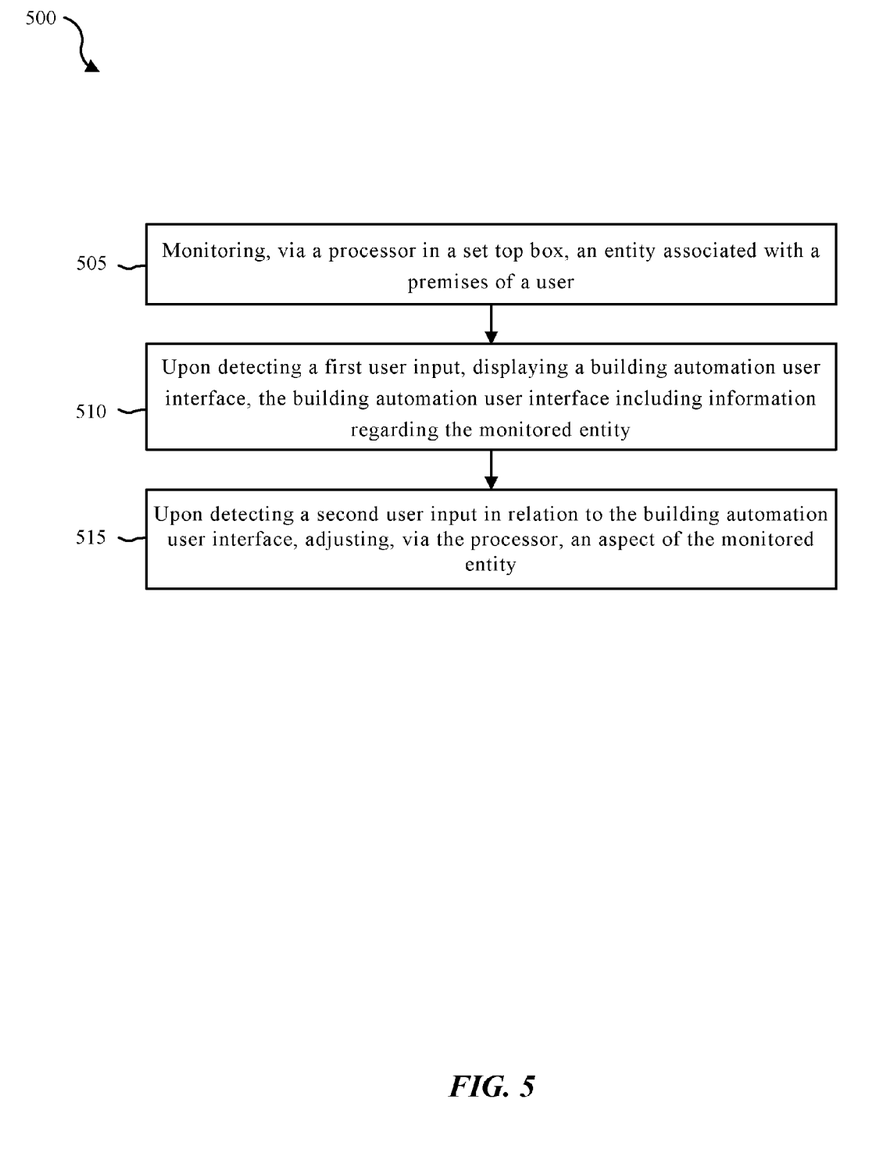
FIG. 5 is a flow diagram illustrating one embodiment of a method for automatically adjusting, via a media set top box, an aspect of an automation system based on a detected action of a user.

FIG. 5 is a flow diagram illustrating one embodiment of a method 500 for receiving a user input to control automation via a media set top box. In some configurations, the method 500 may be implemented by the automation module 145 illustrated in FIG. 1 or 2. In some configurations, the method 500 may be implemented in conjunction with the application 140 and/or the user interface 135 illustrated in FIG. 1.

At block 505, an entity associated with a premises of a user may be monitored. At block 510, upon detecting a first user input, a building automation user interface may be displayed. The building automation user interface may include information regarding at least one of the one or more sensors. At block 515, upon detecting a second user input in relation to the automation user interface, an aspect of at least one of the one or more sensors may be adjusted. In some embodiments, the first and second user inputs may include a voice command input, a video gesture input (a predetermined pattern of movement made by the hand and detected by a camera, for example), tactile gesture input (a predetermined pattern of movement made by the hand on a touch pad, for example), a mobile computing device input, a remote control device input, and the like.

Figure 6:
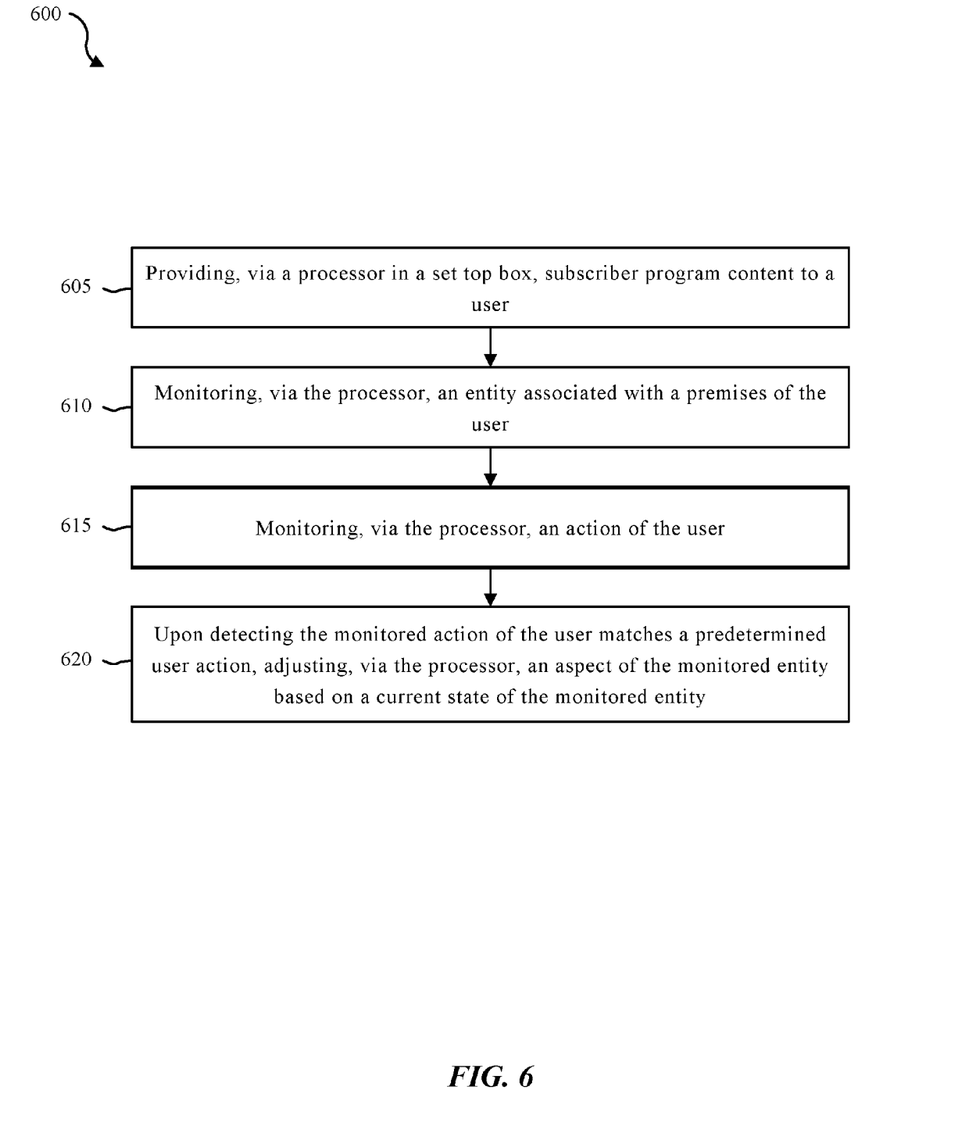
FIG. 6 is a flow diagram illustrating one embodiment of a method for providing an automation channel in a channel guide of a media set top box.

FIG. 6 is a flow diagram illustrating one embodiment of a method 600 for automatically adjusting, via a media set top box, an aspect of an automation system based on a detected action of a user. In some configurations, the method 600 may be implemented by the automation module 145 illustrated in FIG. 1 or 2. In some configurations, the method 600 may be implemented in conjunction with the application 140 and/or the user interface 135 illustrated in FIG. 1.

At step 605, subscriber program content may be provided to a user. At block 610, an entity associated with a premises may be monitored. At block 615, an action of the user may be monitored. At block 620, upon detecting the monitored action of the user matches a predetermined user action, an aspect of at least one of the one or more sensors may be adjusted based on a current state of the one or more sensors.

Figure 7:
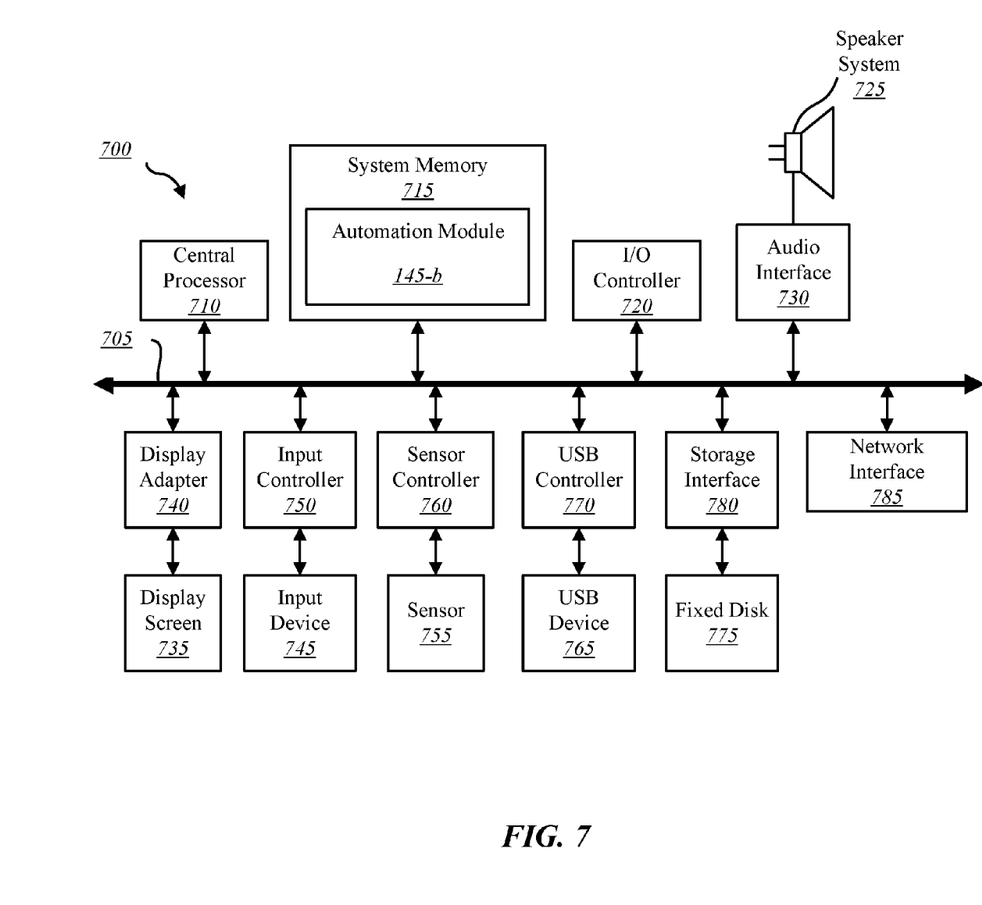
FIG. 7 depicts a block diagram of a computer system suitable for implementing the present systems and methods.

FIG. 7 depicts a block diagram of a controller 700 suitable for implementing the present systems and methods. The controller 700 may be an example of the set top box device 105, mobile computing device 155, and/or automation controller 160 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the automation module 145-b to implement the present systems and methods may be stored within the system memory 715. Applications (e.g., application 140) resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for integration of a set top box and an automation system, the method comprising:
   providing, via one or more processors, subscriber program content;
   monitoring, via the one or more processors, an aspect of a premises using one or more sensors;
   detecting, via the one or more processors, a predetermined change related to the monitored aspect of the premises, wherein the predetermined change comprises an imminent expiration of a timer associated with the monitored aspect of the premises;
   generating a notification including information regarding the predetermined change;
   altering a type of the notification based at least in part on a content being currently viewed on the set top box;
   providing, via the one or more processors, the notification for display in at least a portion of a viewing area of the content being currently viewed on the set top box;
   pausing the content being currently viewed on the set top box to display the notification on at least a portion of the paused content;
   receiving in response to the displayed notification, a user input to update the timer associated with the monitored aspect of the premises, wherein the user input comprises an amount of additional time to add to the timer associated with the monitored aspect of the premises;
   updating the timer based at least in part on the received user input; and
   resuming the paused content upon determining that a predetermined period of time has lapsed after the notification was displayed.

2. The method of claim 1, further comprising:
   providing a monitor channel to display the monitored aspect of the premises, the monitor channel being displayed in a channel guide among channels of the subscriber program content.

3. The method of claim 1, further comprising:
   tracking a plurality of entities associated with the premises, wherein the predetermined change related to the monitored aspect of the premises is based at least in part on a predetermined change related to at least one of the plurality of entities associated with the premises.

4. The method of claim 3, further comprising;
   providing a tracking channel among channels of the subscriber program content, the tracking channel to display a map of the tracked plurality of entities.

5. The method of claim 1, further comprising:
   modifying a native application programming interface (API) of the set top box in order to provide a monitor channel in a channel guide among channels of the subscriber program content; and upon receiving a user command, scheduling the set top box to record the monitor channel for a specified duration on a specified date.

6. The method of claim 1, further comprising:
receiving a user input in response to the displayed notification, wherein the notification is displayed based at least in part on the detected predetermined change.

7. The method of claim 6, wherein the notification is displayed on the viewing area of paused content.

8. The method of claim 7, further comprising:
determining whether the user input is received within the predetermined period of time; and
upon determining that the user input is received within the predetermined period of time, resuming the paused content.

9. The method of claim 6, wherein the content being currently viewed on the set top box further comprises a presently viewed channel of the subscriber program content.

10. The method of claim 6, further comprising:
upon detecting a first user input, displaying an automation user interface, the automation user interface including information regarding the one or more sensors; and
upon detecting a second user input in relation to the automation user interface, adjusting, via the processor, an aspect of at least one of the one or more sensors.

11. The method of claim 10, wherein the first and second user inputs comprise at least one of a voice command input, a video gesture input, tactile gesture input, a mobile computing device input, and a remote control device input.

12. The method of claim 1, further comprising:
monitoring an action of a user; and
upon detecting the monitored action of the user matches a predetermined user action, adjusting an aspect of at least one of the one or more sensors based on a current state of the one or more sensors.

13. The method of claim 12, further comprising:
identifying a pattern associated with the monitored action of the user;
detecting an initiation of the identified pattern associated with the monitored action of the user; and
upon detecting the initiation of the identified pattern, adjusting an aspect of at least one of the one or more sensors.

14. A home automation system configured for integration of a set top box and an automation system, comprising:
a processor;
one or more speakers;
memory in electronic communication with the processor;
instructions stored in the memory, the instructions being executable by the processor to:
provide subscriber program content;
monitor an aspect of a premises using one or more sensors;
detect a predetermined change related to the monitored aspect of the premises, wherein the predetermined change comprises an imminent expiration of a timer associated with the monitored aspect of the premises;
generate a notification including information regarding the predetermined change;
alter a type of the notification based at least in part on a content being currently viewed on the set top box;
provide the notification for display in at least a portion of a viewing area of the content being currently viewed on the set top box;
pause the content being currently viewed on the set top box to display the notification on at least a portion of the paused content;
receive in response to the displayed notification, a user input to update the timer associated with the monitored aspect of the premises, wherein the user input comprises an amount of additional time to add to the timer associated with the monitored aspect of the premises;
update the timer based at least in part on the received user input; and
resume the paused content upon determining that a predetermined period of time has lapsed after the notification was displayed.

15. The home automation system of claim 14, wherein the instructions are executable by the processor to:
provide a monitor channel to display the monitored aspect of the premises, the monitor channel being displayed in a channel guide among channels of the subscriber program content.

16. The home automation system of claim 14, wherein the instructions are executable by the processor to:
track a plurality of entities associated with the premises, wherein the predetermined change related to the monitored aspect of the premises is based at least in part on a predetermined change related to at least one of the plurality of entities associated with the premises.

17. The home automation system of claim 16, wherein the instructions are executable by the processor to:
provide a tracking channel among channels of the subscriber program content, the tracking channel to display a map of the tracked plurality of entities.

18. The home automation system of claim 14, wherein the instructions are executable by the processor to:
modify a native application programming interface (API) of the set top box in order to provide a monitor channel in a channel guide among channels of the subscriber program content; and
upon receiving a user command, schedule the set top box to record the monitor channel for a specified duration on a specified date.

19. A computer-program product for integrating, via a processor, a set top box and automation system, the computer-program product comprising a non-transitory computer-readable medium storing instructions thereon, the instructions being executable by the processor to:
provide subscriber program content;
monitor an aspect of a premises using one or more sensors;
detect a predetermined change related to the monitored aspect of the premises, wherein the predetermined change comprises an imminent expiration of a timer associated with the monitored aspect of the premises;
generate a notification including information regarding the predetermined change;
alter a type of the notification based at least in part on a content being currently viewed on the set top box;
provide the notification for display in at least a portion of a viewing area of the content being currently viewed on the set top box;
pause the content being currently viewed on the set top box to display the notification on at least a portion of the paused content;
receive in response to the displayed notification, a user input to update the timer associated with the monitored aspect of the premises, wherein the user input comprises an amount of additional time to add to the timer associated with the monitored aspect of the premises;
update the timer based at least in part on the received user input; and resume the paused content upon determining that a predetermined period of time has lapsed after the notification was displayed.

20. The computer-program product of claim 19, wherein the instructions are executable by the processor to:
provide a monitor channel to display the monitored aspect of the premises, the monitor channel being displayed in a channel guide among channels of the subscriber program content.

* * * * *